United States Patent
Matasek et al.

(10) Patent No.: US 6,554,482 B1
(45) Date of Patent: Apr. 29, 2003

(54) ADAPTER SYSTEM FOR FIBER OPTIC CONNECTORS

(75) Inventors: Jeffrey A. Matasek, Cedarburg, WI (US); Scot Ernst, Plainfield, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/027,058

(22) Filed: Dec. 20, 2001

(51) Int. Cl.⁷ .................................................. G02B 6/38
(52) U.S. Cl. ............................. 385/55; 385/77; 385/136
(58) Field of Search .......................... 385/55, 52, 60, 385/74–77, 56, 136, 137, 139

(56) References Cited

U.S. PATENT DOCUMENTS

| | | | | |
|---|---|---|---|---|
| 5,142,597 A | * | 8/1992 | Mulholland et al. | 385/56 |
| 5,245,683 A | * | 9/1993 | Belenkiy et al. | 385/72 |
| 5,719,977 A | * | 2/1998 | Lampert et al. | 385/60 |
| 5,748,821 A | * | 5/1998 | Schempp et al. | 385/76 |
| 6,130,983 A | * | 10/2000 | Cheng | 385/139 |
| 6,340,247 B1 | * | 1/2002 | Sakurai et al. | 385/78 |
| 6,431,762 B1 | * | 8/2002 | Taira et al. | 385/56 |

* cited by examiner

Primary Examiner—Lynn D. Feild
Assistant Examiner—Hae Moon Hyeon
(74) Attorney, Agent, or Firm—A. A. Tirva

(57) ABSTRACT

An adapter assembly is provided for mating a fiber optic connector along an optic axis with a complementary connecting device. The assembly includes a pair of adapter halves secured together at an interface by means of a securing post projecting from one adapter half generally parallel to the optic axis and into a securing hole in the other adapter half. The securing post has a retaining hole extending transversely of the optic axis. The other adapter half has a passage extending from an outside wall into registry with the retaining hole in the securing post of the one adapter half when the post is inserted into the securing hole in the other adapter half. A securement pin is insertable through the passage in the other adapter half into the retaining hole in the securing post of the one adapter half to, thereby, secure the adapter halves in assembly.

16 Claims, 3 Drawing Sheets

ADAPTER SYSTEM FOR FIBER OPTIC CONNECTORS

FIELD OF THE INVENTION

This invention generally relates to the art of fiber optic connectors and, particularly, to a receptacle, such as an adapter, for receiving a fiber optic connector at one or both ends of the adapter.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together at an optical interface so that their encapsulated fibers connect end-to-end. The adapter may be an in-line component, or the adapter can be designed for mounting in an opening in a panel, backplane, circuit board or the like.

Various problems are encountered with adapters, receptacles and like devices which couple the connectors at an optical interface because the adapter or receptacle often is fabricated of two parts. The adapter is fabricated in two parts because ceramic split sleeves often are used in the adapter to center the connector ferrules, and it is much easier to assemble the sleeves through holes in the interfacing surfaces of the adapter parts. For instance, a pair of adapter halves may be joined at an optical interface by ultrasonically welding the parts together. This is common where the adapter parts are fabricated of plastic material. Unfortunately, the ultrasonic welds cause flashing problems as well as durability problems. In addition, such joining techniques cannot be used where the adapter halves are fabricated of die cast metal material, for instance. Alternatively, the adapter halves may be joined by a press-fit or a "snap" together procedure, but these techniques often create considerable "play" between the adapter halves which decreases performance, and such techniques do not work well with metal components such as die cast material. Still further, the adapter halves may be joined by extraneous fasteners, brackets or the like which take up space on the outside of the adapter assembly. Often, there is insufficient space to accommodate such fastening mechanisms. The present invention is directed to solving these various problems by providing a unique interfacing system between a pair of halves of an adapter, receptacle or the like for coupling fiber optic connectors together at an optical interface.

SUMMARY OF THE INVENTION

An object, therefore, of the invention is to provide a new and improved adapter or receptacle assembly for mating a fiber optic connector along an optic axis with a complementary connecting device.

Another object of the invention is to provide a new and improved interfacing system between a pair of receptacle or adapter type components.

In the exemplary embodiment of the invention, a pair of adapter halves are secured together at an interface by means of a securing post projecting from one adapter half at the interface generally parallel to the optic axis into a securing hole in the other adapter half. The securing post has a retaining hole extending transversely of the optic axis. The other adapter half has a passage extending from an outside wall into registry with the retaining hole in the securing post of the one adapter half. A securing pin is insertable through the passage in the other adapter half into the retaining hole in the securing post of the one adapter half to, thereby, secure the adapter halves in assembly.

According to one aspect of the invention, at least a pair of the securing posts and respective securing holes are provided. The securing posts and securing holes are spaced from each other transversely of the optic axis. A pair of the passages extend into registry with the respective retaining holes in the pair of securing posts. A one-piece securement clip forms a pair of the securement pins insertable through the pair of passages into the respective retaining holes. As disclosed herein, the one-piece securement clip is generally U-shaped to define a pair of leg portions which form the pair of the securement pins. The pair of passages and respective retaining holes are generally parallel.

According to another aspect of the invention, one of the pair of securing posts and a respective one of the securing holes are on each of the adapter halves at the interface. One of the pair of the passages is in each adapter half in registry with the retaining hole in the securing post of the other adapter half. In an alternate embodiment of the invention, both securing posts are on one adapter half and extend into a pair of securing holes in the other adapter half.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
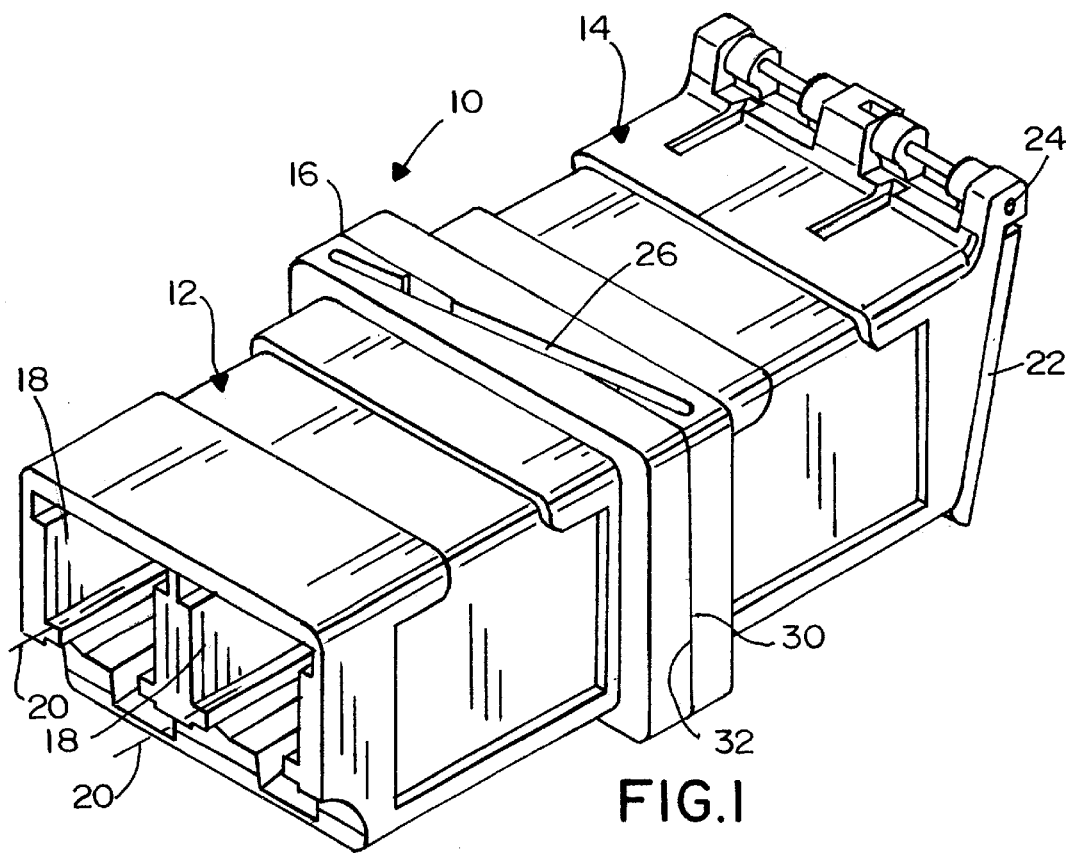
FIG. 1 is a perspective view of an adapter assembly embodying the concepts of the invention.
Figure 2:
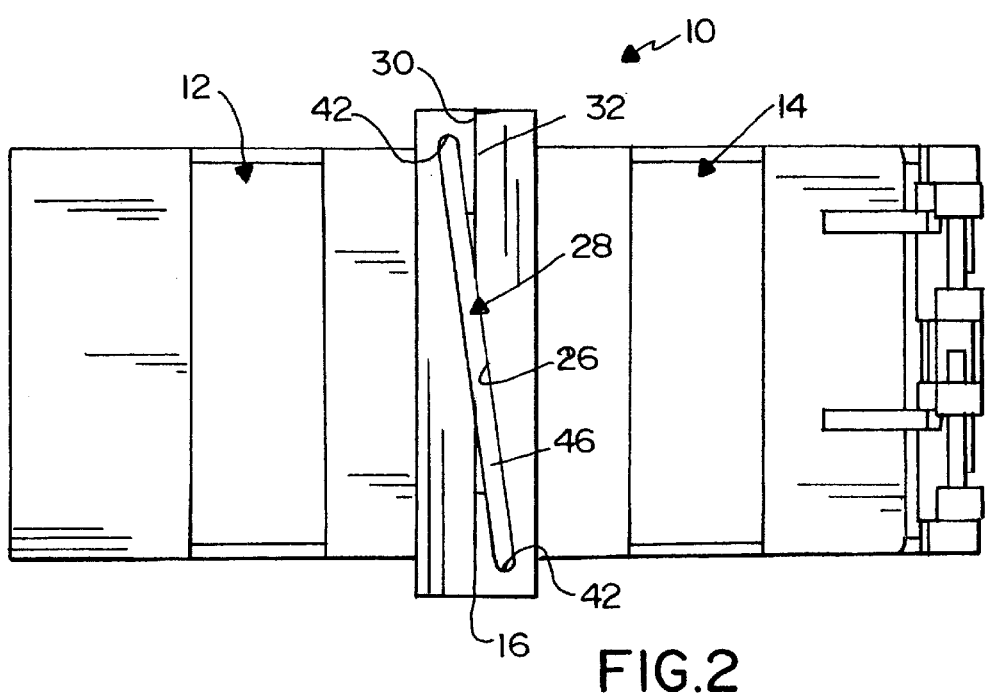
FIG. 2 is a top plan view of the assembly.

Referring to the drawings in greater detail, and first to FIGS. 1 and 2, the nvention is illustrated in an adapter assembly, generally designated 10, which includes pair of adapter halves, generally designated 12 and 14. The adapter halves are joined at an interface 16. In this embodiment of the invention, the adapter assembly is a "duplex" assembly in that each adapter half includes a pair of receptacles 18 for receiving a pair of fiber optic connectors along a pair of optic axes 20 (FIG. 1). Adapter half 14 includes a pair of spring-loaded shutters or doors 22 which are hinged, as at 24, to close the openings to the receptacles of adapter half 14. The shutters prevent the accumulation of dust and dirt within the adapter assembly and also protect an operator's eyes from dangerous light beams from exposed ends of active optical fibers from connectors mounted within adapter half 12. Finally, FIG. 2 best shows that a diagonal slot 26 is formed in adapter assembly 10 and diagonally crosses interface 16 between the adapter halves. In other words, opposite ends of slot 26 are in the opposite adapter halves. The slot receives a securement clip, generally designated 28, for joining the adapter halves together at interface 16, as will be described in greater detail hereinafter.

At this point, it should be understood that the invention herein has a wide range of applications, and adapter assembly 10 is but one example of a use for the interfacing system of the invention. For instance, adapter halves 12 and 14 could have a single receptacle 18 and a single optic axis 20, with or without shutters 22. In addition, rather than an adapter assembly, per se, involving a pair of adapter halves, the invention could be incorporated in a receptacle for receiving an appropriate fiber optic connector, the receptacle being joined to a support for an associated fiber optic transmission means. Therefore, the use of the terms "adapter", "adapter assembly" or the like herein and in the claims hereof are intended in a much broader context to include a pair of receiving components which are joined together at an interface by the interfacing system of the invention.

Figure 3:
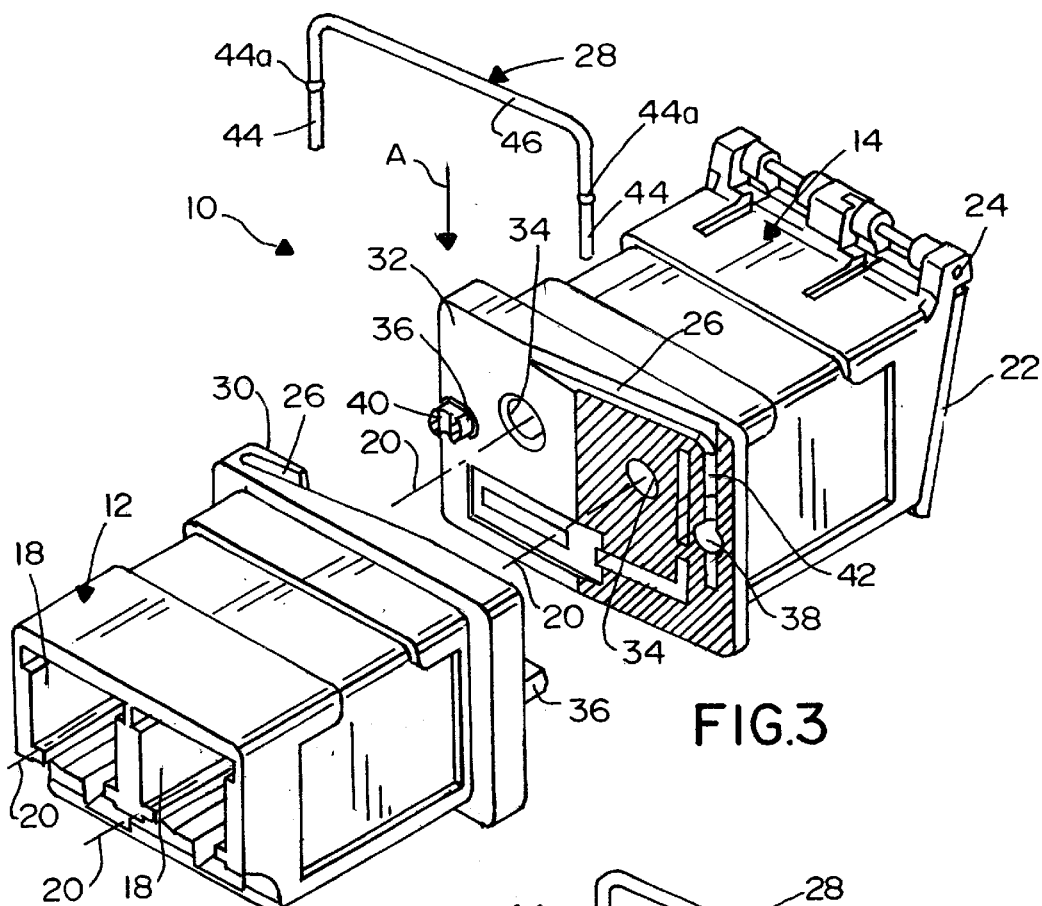
FIG. 3 is an exploded perspective view, partially cut-away to show the passage and the retaining hole in the securing post of one of the adapter halves.
Figure 4:
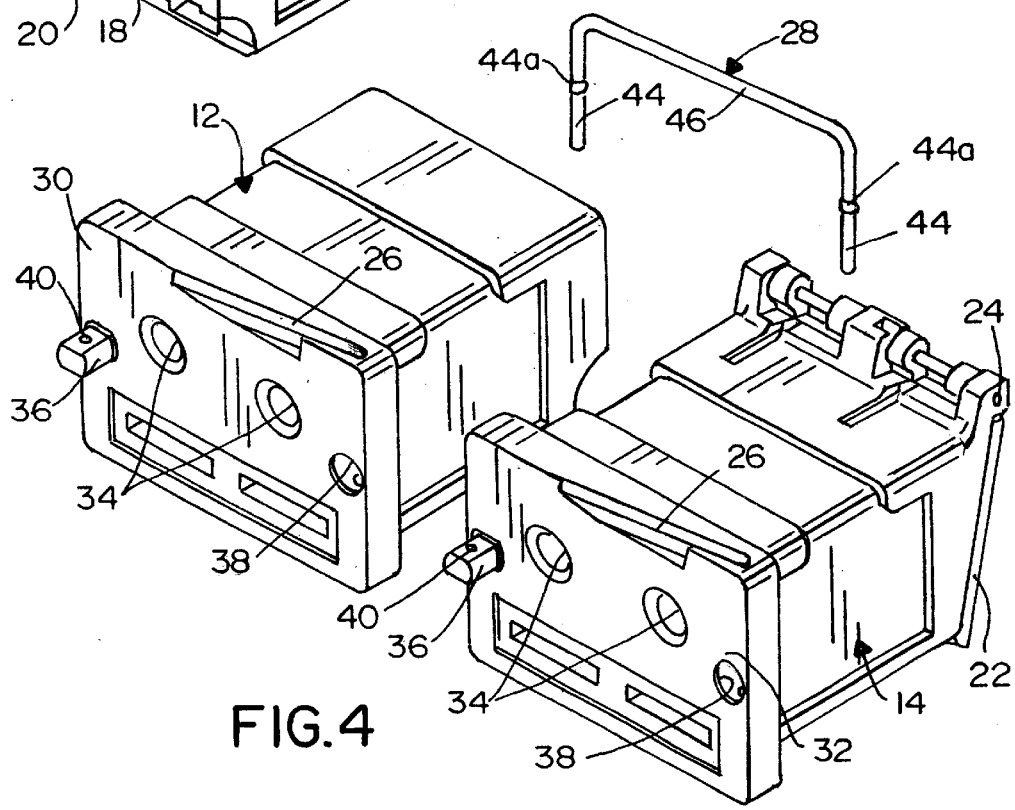
FIG. 4 is an exploded perspective view, with the adapter halves rotated to show their respective interfacing ends.

With that understanding, reference is made to FIGS. 3 and 4 wherein it can be seen that adapter half 12 has an interfacing end 30 and adapter half 14 has an interfacing end 32 which are joined or in abutment at interface 16 (FIGS. 1 and 2). A pair of apertures 34 in each interfacing end 30 and 32 communicate with the pair of receptacles 18 which receive the fiber optic connectors. The apertures in the respective interfacing ends of the adapter assemblies are in registry when the adapter halves are joined as shown in FIGS. 1 and 2. The apertures receive ceramic split sleeves which align the ferrules of the fiber optic connectors and center the optical fibers end-to-end through the adapter assembly.

The interfacing system of the invention includes at least one securing post 36 projecting from the interfacing end of at least one of the adapter halves generally parallel to optical axes 20 and into a securing hole 38 in the other adapter half. In the embodiment of the invention shown in FIGS. 3 and 4, one of the securing posts 36 projects from the interfacing end 30 and 32 of each adapter half 12 and 14, respectively, and into a securing hole 38 in the other adapter half. In other words, each adapter half has one securing post 36 and one securing hole 38. The pair of securing posts and respective securing holes are spaced radially of the optic axes. When the adapter halves are joined 15 as shown in FIGS. 1 and 2, securing posts 36 are inserted into securing holes 38. Each securing post 36 has a retaining hole 40 which extends transversely of optic axes 20. In the illustrated embodiment, retaining holes 40 extend generally vertically as viewed in the drawings.

As best in the cut-away illustration of FIG. 3, each adapter half includes a passage 42 which communicates between securing hole 38 and one end of diagonal slot 26. As viewed in the drawings, the passages are vertically oriented. Therefore, when securing posts 36 are inserted into securing holes 38, passages 42 are in registry with retaining holes 40 in the securing posts.

FIGS. 3 and 4 show that securement clip 28 (FIG. 2) is generally U-shaped to define a pair of parallel leg portions 44 joined by a cross portion 46. The leg portions have stamped "flats" or enlargements 44a. Leg portions 44 of securement clip 28 form securement pins to hold adapter halves 12 and 14 together when securing posts 36 are inserted into securing holes 38.

More particularly, when adapter halves 12 and 14 are placed in abutment with interfacing ends 30 and 32 abutting at interface 16, securing posts 36 are inserted into securing holes 38. When fully inserted, passages 42 are in alignment or registry with retaining holes 40 in the securing posts. Securement clip 28 then is assembled in the direction of arrow "A" (FIG. 3) into diagonal slot 26. The securement pins defined by leg portions 44 of securement clip 28 are inserted downwardly into passages 44 and through retaining holes 40 in securing posts 36. The adapter halves now cannot be separated. Enlargements 44a of securement pins 44 establish an interference fit within passages 42 to prevent the securement clip from inadvertently backing out of passages 42. When securement clip 28 is fully inserted in assembly, cross portion 46 is disposed completely within the bounds of diagonal slot 26 so that it does not project outwardly of the overall profile of the adapter assembly.

Figure 5:
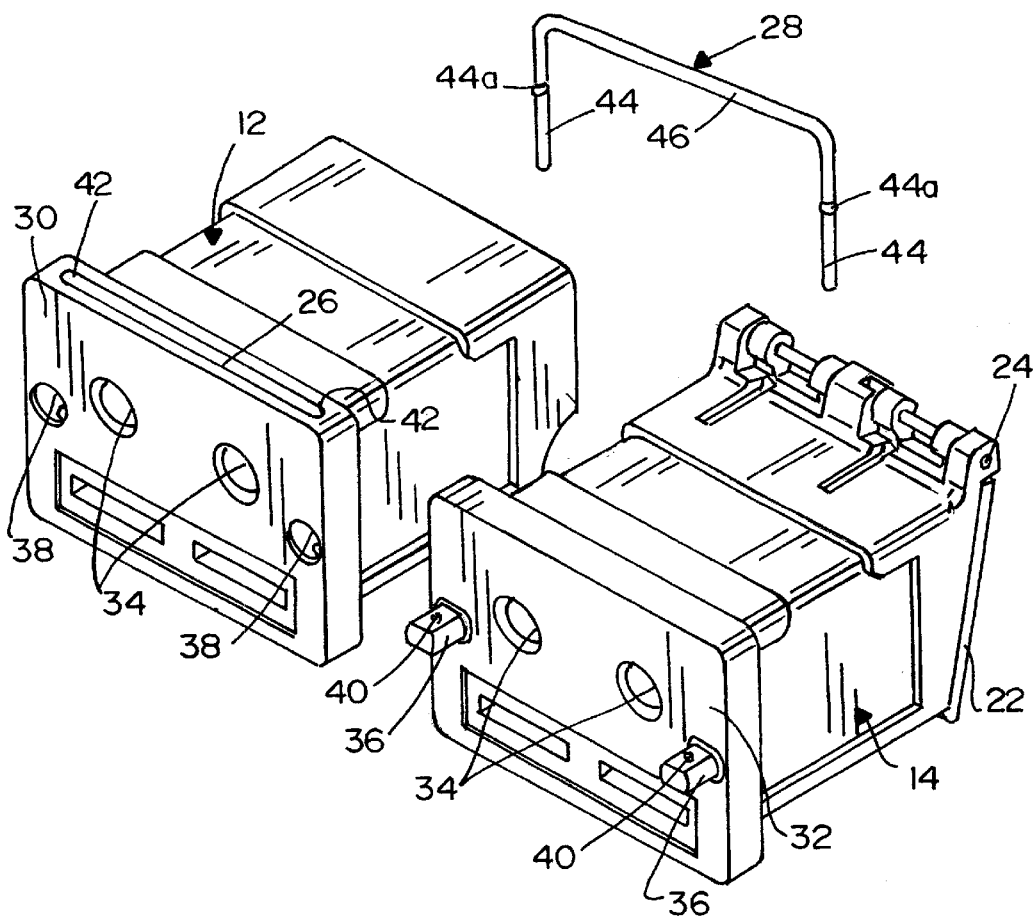
FIG. 5 is a view similar to that of FIG. 4, but of an alternative embodiment of the invention.

FIG. 5 shows an alternate embodiment of the invention, and like reference numerals have been applied in FIG. 5 corresponding to like components described above in relation to the first embodiment of FIGS. 1–4. Specifically, in the second embodiment of FIG. 5, a pair of securing posts 36 project outwardly from the interfacing end of one of the adapter halves, namely interfacing end 32 of adapter half 14. Correspondingly, a pair of securing holes 38 are formed in interfacing end 30 of adapter half 12. Therefore, adapter half 12 has a pair of passages 42 (FIG. 3) communicating with securing holes 36, and slot 26 is located entirely in the top of adapter half 12 rather than extending diagonally across the two adapter halves as in the first embodiment. Of course, two securing posts 36 could project from interfacing end 30 of adapter half 12, with two securing holes 38 in interfacing end 32 of adapter half 14.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An adapter assembly for mating a fiber optic connector along an optic axis with a complementary connecting device, comprising:
   a pair of adapter halves secured together at an interface by means of a securing post projecting from one adapter half at said interface generally parallel to the optic axis and into a securing hole in the other adapter half, the securing post having a retaining hole extending transversely of the optic axis, and said other adapter half having a passage extending from an outside wall into registry with the retaining hole in the securing post of the one adapter half when the post is inserted into the securing hole in the other adapter half, and
   a securement pin insertable through the passage in the other adapter half into the retaining hole in the securing post of the one adapter half to, thereby, secure the adapter halves in assembly.

2. The adapter assembly of claim 1 wherein said securing post and securing hole are spaced radially of the optic axis.

3. The adapter assembly of claim 1, including at least a pair of said securing posts and respective securing holes, the securing posts and securing holes being spaced from each other transversely of the optic axis, with a pair of said passages extending into registry with respective retaining holes in the pair of securing posts.

4. The adapter assembly of claim 3, including a one-piece securement clip forming a pair of said securement pins insertable through said pair of passages into the respective retaining holes.

5. The adapter assembly of claim 4 wherein said one-piece securement clip is generally U-shaped to define a pair of leg portions which form the pair of said securement pins.

6. The adapter assembly of claim 3 wherein one of said pair of securing posts and a respective one of the securing holes are on each of the adapter halves at said interface, with one of said pair of passages being in each adapter half in registry with the retaining hole in the securing post of the other adapter half.

7. The adapter assembly of claim 6 wherein said pair of passages and respective retaining holes are generally parallel.

8. An adapter assembly for mating a fiber optic connector along an optic axis with a complementary connecting device, comprising:

a pair of adapter halves secured together at an interface by means of a pair of securing posts projecting between the adapters at said interface generally parallel to and at opposite sides of the optic axis and into a respective pair of securing holes, each securing post having a retaining hole extending transversely of the optic axis, and a pair of generally parallel passages in at least one of the adapter halves extending from an outside wall thereof into registry with the retaining holes in the securing posts when the posts are inserted into the securing holes; and a one-piece generally U-shaped securement clip defining a pair of generally parallel leg portions which form a pair of securement pins insertable through said pair of passages and into the retaining holes in the pair of securing posts to secure the adapter halves in assembly.

9. The adapter assembly of claim 8 wherein one of said pair of securing posts and a respective one of the securing holes are on each of the adapter halves at said interface, with one of said pair of passages being in each adapter half in registry with the retaining hole in the securing post of the other adapter half.

10. An interfacing system, comprising:

a receptacle having a forward end for receiving an appropriate fiber optic connector inserted thereinto on an optic axis, and a rear end for interfacing with a rear end of a support for an associated fiber optic transmission means;

a securing projection extending parallel to the optic axis from one of the rear end of the receptacle or the support into a securing recess in the other of the rear end of the receptacle or the support, the securing projection having a retaining hole extending transversely to the optic axis -and said other of the rear end of the receptacle or the support having a passage in registry with the retaining hole in the securing post; and a securement pin insertable- through the passage into the retaining hole to secure the receptacle to the support.

11. The interfacing system of claim 10 wherein said securing projection and securing recess are spaced radially of the optic axis.

12. The interfacing system of claim 10, including at least a pair of said securing projections and respective securing recesses, the securing projections and securing recesses being spaced from each other transversely of the optic axis, with a pair of said passages extending into registry with respective retaining holes in the pair of securing projections.

13. The interfacing system of claim 12, including a one-piece securement clip forming a pair of said securement pins insertable through said pair of passages into the respective retaining recesses.

14. The interfacing system of claim 13 wherein said one-piece securement clip is generally U-shaped to define a pair of leg portions which form the pair of said securement pins.

15. The interfacing system of claim 12 wherein one of said pair of securing projections and a respective one of the securing recesses are on each of the rear end of the receptacle and the support, with one of said pair of passages being in each of the rear end of the receptacle and the support in registry with the retaining holes in the securing projections of the other rear end of the receptacle and the support.

16. The interfacing system of claim 15 wherein said pair of passages and respective retaining holes are generally parallel.

* * * * *